J. F. STRATTON.
Boiler Feed-Regulator.
No. 166,945.  Patented Aug. 24, 1875.
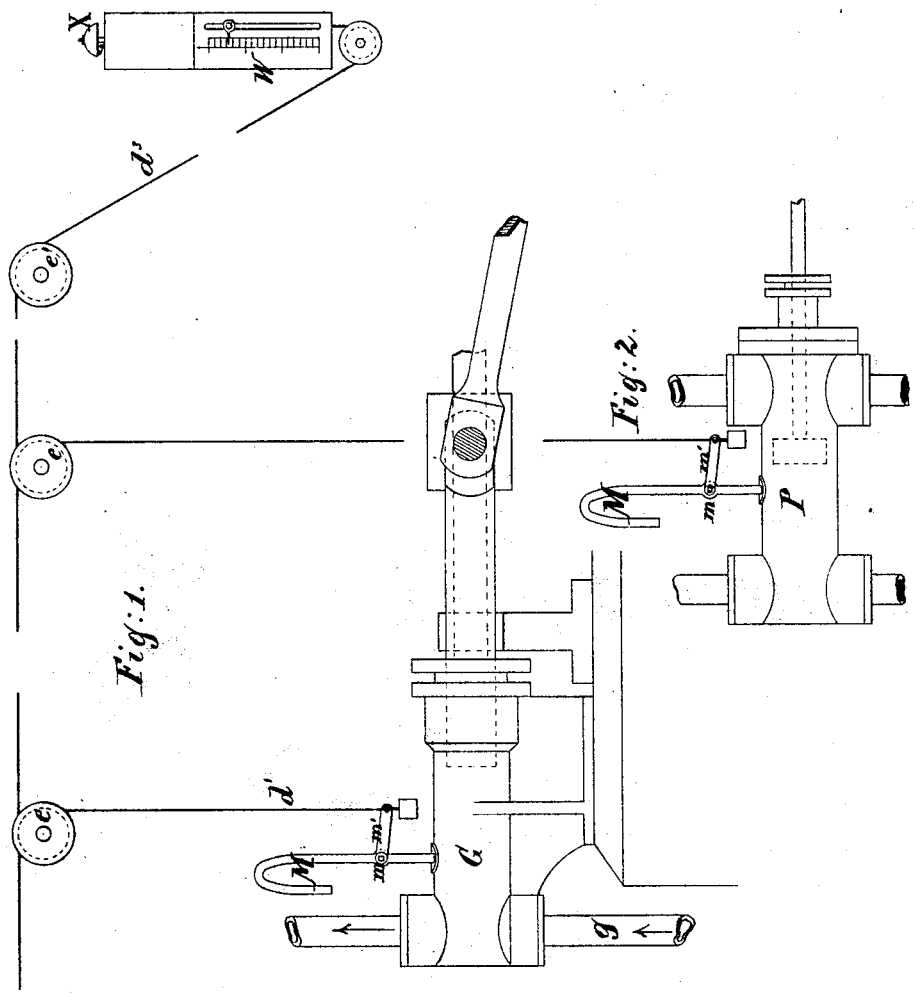
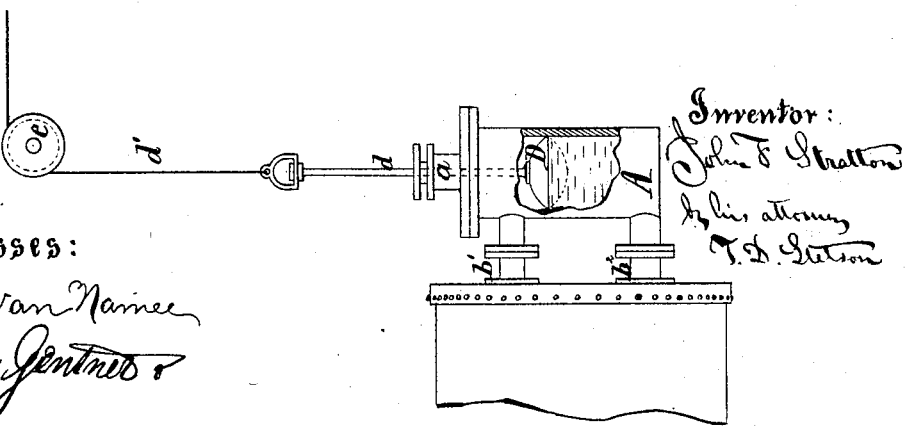

UNITED STATES PATENT OFFICE.

JOHN F. STRATTON, OF NEW YORK, N. Y.

IMPROVEMENT IN BOILER-FEED REGULATORS.

Specification forming part of Letters Patent No. 166,945, dated August 24, 1875; application filed April 20, 1875.

*To all whom it may concern:*

Be it known that I, JOHN F. STRATTON, of New York city, in the State of New York, temporarily residing at Gohlis, near Leipsic, in the Kingdom of Saxony, have invented certain Improvements relating to Boiler-Feed Regulators, of which the following is a specification:

I have connected a small air cock or valve with a float in the boiler, or a connecting-chamber, so that, with an insignificant resistance and simple mechanism, the rising of the float may admit sufficient air to affect the action of the pump.

The details of the apparatus may be modified within wide limits. The following is a description of what I consider the best means of carrying out the invention. The accompanying drawings form a part of this specification.

Figure 1 is a view of one form of the apparatus complete. Fig. 2 represents a different form of the apparatus. It shows only the pump and its adjuncts. The float and the connections thereto may be the same with Fig. 2 as are shown in Fig. 1.

Similar letters of reference indicate corresponding parts in all the figures.

A is a hollow chamber, of sufficient height, connected with the boiler by a pipe, $b^1$, above the water-level, and by another pipe, $b^2$, below. A delicate stuffing-box, $a$, allows the movement of a rod, $d$, which may, if preferred, be a slender wire extending from an inclosed float, D, and connecting with a fine wire or string, $d'$, which is guided over pulleys $e$. G represents the barrel or body of a single-acting horizontal pump. It will be understood as provided with ordinary pipes and valves for the induction and discharge of the water, and as having its plunger or piston operated uniformly by connection with the working parts of the engine. The capacity of the interior of this pump is necessarily filled and discharged at each revolution of the engine. M is a pipe, preferably curved, as represented, and which may be efficient, if quite small. It connects with the interior of the pump near its receiving and delivering end, and is controlled by a cock, $m$, having a lever, $m'$, to which the cord $d'$ is attached. If the weight of the lever $m'$ is not sufficient to operate the cock reliably when the string $d'$ is released by the rising of the float, it should be weighted. When the water is low, the string $d'$ holds the lever $m'$ up and keeps the cock $m$ closed, so that the pump G is effective to throw its whole capacity in the boiler. When the float rises, and the lever $m'$ is lowered, the cock $m$, which may be a quite small one working almost without resistance, commences to draw in air and to discharge the same mingled with water at each reciprocation of the pump. Under ordinary conditions this takes place to a moderate extent. Any change of level of the water, by increasing or diminishing the aperture, appreciably changes the action of the pump. When the water is very high, and the cock $m$ wide open, the induction of air is sufficient to fill the whole capacity of the pump, so that no water is forced into the boiler, yet the pump is retained in condition for instant working the moment the cock $m$ is shut. The water discharged with the air from the pipe M may be led back to the hot-well or other source by a suitable spout.

In Fig. 2, P shows the invention, or a modification of it, with the pipe M connected to the middle of a double-acting pump. Thus situated it will supply air to both ends of the pump.

The cord $d^3$, operated by the same float D, passes under a pulley, $e'$, and operates a delicate index, W, which may traverse on a scale in the office of the owner, or at any other desired point to indicate constantly the level of the water in the boiler.

I can attach clock-work, which will be let off by the motion of the indicator W, and will cause the bell X to strike if the water should, in any case, arrive at a dangerously-low stage, or should by any chance be much too high.

If it shall be preferred for any reason in any case to connect the pipe M to the upper portion of the suction-pipe $g$, which brings the water from the well or reservoir to the pump G, it will serve in pretty nearly the same manner by allowing air to be inducted through it into the pump whenever the cock $m$ is opened. It will not, in such case, discharge water in the same way during the inward thrust of the plunger, and this may, under some circumstances, be a preferable mode of attaching it. There should, in such case, be a check-valve in the lower end of the suction-pipe $g$ to prevent the water therein from descending into the well, and to hold it ready to flow again into the pump the moment the stop-cock $m$ is closed or nearly closed. If, instead of the pipe M and small air-cock $m$, as arranged, a stop-cock is employed in the water-delivery pipe, the cock and its adjuncts must necessarily be of considerable size, and are liable to oppose such resistance as will require a much larger float to insure reliable working.

I claim as my invention—

The cock $m$ in the pipe M, adapted to induct air into the pump, as represented, in combination with the feed-pump G and with the float D, moving with the water-level of the boiler, as and for the purposes specified.

In testimony whereof I have hereunto set my hand this 23d day of March, 1875, in the presence of two subscribing witnesses.

JOHN F. STRATTON.

Witnesses:
  FRIEDRICH LAZER,
  FR. KUNTZ.